United States Patent
Salkintzis et al.

(10) Patent No.: US 11,533,680 B2
(45) Date of Patent: *Dec. 20, 2022

(54) CREATING A NETWORK SLICE SELECTION POLICY RULE

(71) Applicant: Motorola Mobility LLC, Chicago, IL (US)

(72) Inventors: Apostolis Salkintzis, Athens (GR); Genadi Velev, Darmstadt (DE)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/205,913

(22) Filed: Mar. 18, 2021

(65) Prior Publication Data

US 2021/0211976 A1 Jul. 8, 2021

Related U.S. Application Data

(63) Continuation of application No. 16/625,483, filed as application No. PCT/EP2017/065024 on Jun. 20, 2017, now Pat. No. 10,986,567.

(51) Int. Cl.
*H04W 48/18* (2009.01)
*H04W 4/50* (2018.01)
*H04W 4/60* (2018.01)
*H04W 28/02* (2009.01)

(52) U.S. Cl.
CPC ............ *H04W 48/18* (2013.01); *H04W 4/50* (2018.02); *H04W 4/60* (2018.02); *H04W 28/0215* (2013.01)

(58) Field of Classification Search
CPC ..... H04W 28/0215; H04W 4/50; H04W 4/60; H04W 48/00; H04W 48/18; H04W 84/00
See application file for complete search history.

(56) References Cited

U.S. PATENT DOCUMENTS

| 2019/0029065 A1 | 1/2019 | Park et al. |
| 2019/0261159 A1 | 8/2019 | Wang et al. |
| 2019/0373441 A1 | 12/2019 | Ryu et al. |

OTHER PUBLICATIONS

PCT/EP2017/065024, "Notification of Transmittal of the International Search Report and the Written Opinion of the International Searching Authority, or the Declaration" PCT, dated Dec. 5, 2017, pp. 1-15.

(Continued)

*Primary Examiner* — Philip Sobutka
(74) *Attorney, Agent, or Firm* — Kunzler Bean & Adamson

(57) ABSTRACT

Apparatuses, methods, and systems are disclosed for creating a network slice section policy ("NSSP") rule. One apparatus includes a processor and a transceiver for communicating with a network function in a mobile communication network. The processor receives a first request from the network function, the first request comprising a list of one or more application identifiers and a corresponding application profile and application provider for each application identifier. The processor determines one or more network slice identifiers for each application identifier using the corresponding application profile and application provider. The processor also creates a NSSP rule for each application identifier in the list of application identifiers, the NSSP rule containing the application identifier and the associated one or more network slice identifiers.

20 Claims, 5 Drawing Sheets

(56) References Cited

OTHER PUBLICATIONS

Motorola Mobility, Lenovo, "Application Function influence on slice selection", SA WG2 Meeting #122 S2-174262, Jun. 26-30, 2017, pp. 1-5.

Motorola Mobility, Lenovo, Huawei, "Interim agreement: Determination of NSSAI based on UE policy", SA WG2 Meeting #118 S2-167157, Nov. 14-28, 2016, pp. 1-3.

3GPP, "3rd Generation Partnership Project; Technical Specification Group Services and System Aspects; Procedures for the 5G System; Stage 2 (Release 15)", 3GPP TS 23.502 V0.4.0, May 2017, pp. 1-126.

3GPP, "3rd Generation Partnership Project; Technical Specification Group Services and System Aspects; System Architecture for the 5G System; Stage 2 (Release 15)", 3GPP TS 23.501 V0.4.0, Apr. 2017, pp. 1-124.

3GPP, "3rd Generation Partnership Project; Technical Specification Group Services and System Aspects; Architecture enhancements to facilitate communications with packet data networks and applications (Release 15)", 3GPP TS 23.682 V15.1.0, Jun. 2017, pp. 1-118.

| Application Profile Set 400 | Set Index 410 | Profile Definition 415 |
|---|---|---|
| Profile Entries 405 | Application Profile #1 | Application Profile ID = 1001; Application Type = Telemetry; Traffic Rate < 10KByte / day |
| | Application Profile #2 | Application Profile ID = 1010; Application Type = e-Health; Delay < 5ms |
| | Application Profile #3 | Application Profile ID = 1012; Application Type = Automotive; |
| | Application Profile #4 | Application Profile ID = 1015; Application Type = Remote Control; Delay < 2ms |
| | Application Profile #5 | Application Profile ID = 1023; Application Type = Consumer Media |
| | Application Profile #6 | Application Profile ID = 1029; Application Type = Public Safety; Delay < 10ms |
| | ⋮ | ⋮ |
| | Application Profile #N | Application Profile ID = 1034; Application Type = Generic; Traffic Rate < Unspecified |

FIG. 4

CREATING A NETWORK SLICE SELECTION POLICY RULE

FIELD

The subject matter disclosed herein relates generally to wireless communications and more particularly relates to creating a NSSP rule based on an application identifier and corresponding application profile and application provider.

BACKGROUND

The following abbreviations and acronyms are herewith defined, at least some of which are referred to within the following description.

Third Generation Partnership Project ("3GPP"), Access and Mobility Management Function ("AMF"), Application Function ("AF"), Downlink ("DL"), Enhanced Mobile Broadband ("eMBB"), Evolved Node B ("eNB"), European Telecommunications Standards Institute ("ETSI"), Frequency Division Duplex ("FDD"), Frequency Division Multiple Access ("FDMA"), Hybrid Automatic Repeat Request ("HARQ"), Internet Protocol ("IP"), Internet-of-Things ("IoT"), Long Term Evolution ("LTE"), LTA Advanced ("LTE-A"), Medium Access Control ("MAC"), Multiple Access ("MA"), Mobility Management Entity ("MME"), Machine Type Communication ("MTC"), Massive MTC ("mMTC"), Narrowband ("NB"), Network Exposure Function ("NEF"), Network Function ("NF"), Network Slice Selection Assistance Information ("NSSAI"), Network Slice Selection Policy ("NSSP"), Next Generation Node B ("gNB"), Packet Data Unit ("PDU"), Policy Control Function ("PCF"), Public Land Mobile Network ("PLMN"), Quality of Service ("QoS"), Radio Access Network ("RAN"), Radio Resource Control ("RRC"), Session Management Function ("SMF"), Single-Network Slice Selection Assistance Information ("S-NSSAI"), Transmission Control Protocol ("TCP"), Time-Division Duplex ("TDD"), Time Division Multiplex ("TDM"), Transmission and Reception Point ("TRP"), Transmit ("TX"), Unified Data Management ("UDM"), User Data Repository ("UDR"), User Datagram Protocol ("UDP"), User Entity/Equipment (Mobile Terminal) ("UE"), Ultra-Reliability and Low Latency Communications ("URLLC"), Uplink ("UL"), Universal Mobile Telecommunications System ("UMTS"), User Plane Function ("UPF"), and Worldwide Interoperability for Microwave Access ("WiMAX"). As used herein, "HARQ-ACK" may represent collectively the Positive Acknowledge ("ACK") and the Negative Acknowledge ("NACK") or ("NAK"). ACK means that a TB is correctly received while NAK means a TB is erroneously received.

In mobile communication networks, a Network Slice Selection Policy ("NSSP") is used to associate one or more application identities with one or more Single-Network Slice Selection Assistance Information ("S-NSSAI"). An S-NSSAI essentially identifies a certain network slice in the 5G network that should be used to carry the traffic of the associated application. The NSSP includes a plurality of NSSP rules, each NSSP rule associating an application identity with one or more S-NSSAIs (e.g., network slices). Conventionally, this policy is manually constructed by the operator. However, manual NSSP construction is cumbersome and time consuming as the operator needs to consider many different applications and manually assign each one of them to one or more S-NSSAIs.

BRIEF SUMMARY

Methods for creating a NSSP rule based on an application identifier and corresponding application profile and application provider are disclosed. Apparatuses and systems also perform the functions of the methods. One method for creating a NSSP rule based on an application identifier and corresponding application profile and application provider includes receiving a first request from a network function and determining one or more network slice identifiers associated with each application identifier in the list of application identifiers. Here, the first request includes a list of application identifiers and for each application identifier a corresponding application profile and a corresponding application provider. The one or more network slice identifiers are determined based on the corresponding application profile and on the corresponding application provider of the application identifier. In some embodiments, the method also includes creating a NSSP rule for each application identifier in the list of application identifiers, the NSSP rule containing the application identifier and the associated one or more network slice identifiers.

One system for creating a NSSP rule based on an application identifier and corresponding application profile and application provider includes a network exposure function ("NEF") for a mobile communication network and a unified data management ("UDM") node. Here, the UDM node receives a first request from the NEF, wherein the first request includes a set of one or more application identifiers and, for each application identifier, a corresponding application profile and a corresponding application provider. The UDM node determines one or more network slice identifiers associated with each identified application based on the corresponding application profile and on the corresponding application provider of each application identifier. The UDM node also creates a NSSP rule for each application identifier in the set of one or more application identifiers, the NSSP rule containing the application identifier and the associated one or more network slice identifiers.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating one embodiment of a set of application profiles used for creating a NSSP rule based on an application identifier and corresponding application profile and application provider and;

DETAILED DESCRIPTION

Figure 1:
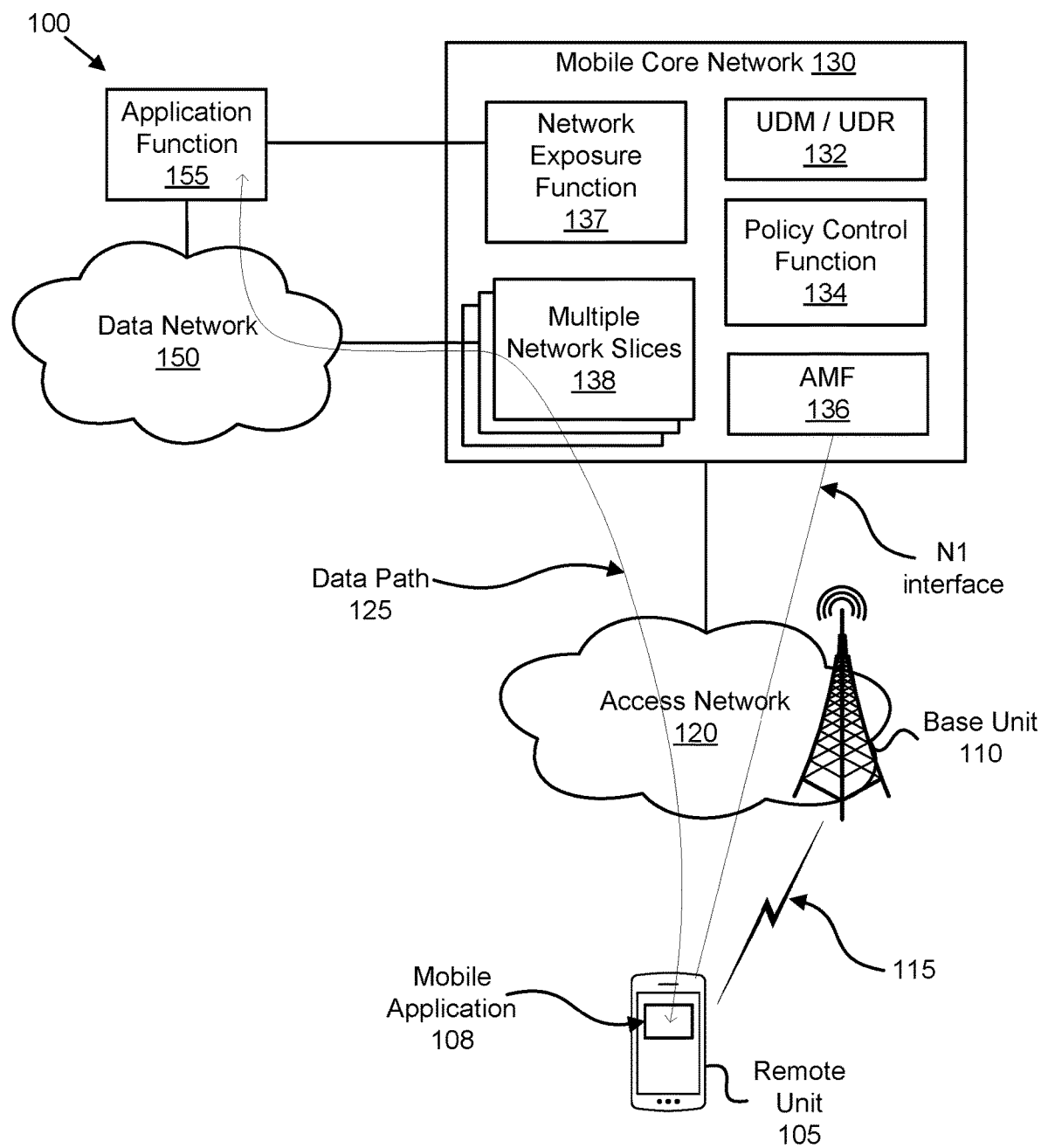
FIG. 1 is a schematic block diagram illustrating one embodiment of a wireless communication system for creating a NSSP rule based on an application identifier and corresponding application profile and application provider.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to automatically construct the NSSP in a 5G mobile network, and to easily manage the NSSP and its distribution, a data management node, such as an UDM, receives a request to set a policy rule relating to network slice selection. In some embodiments, the request is received via a network exposure function ("NEF"). Here, the NEF may receive a request from a third-party application function ("AF") associated with one or more application utilized by a UE, where the AF requests to map an application supported by the AF with one of a set of predetermined application profiles and with a specific application provider. The NEF formats the received request and sends the formatted request to the UDM as a request to set a policy rule relating to network slice selection. In other embodiments, the UDM receives the request to set a policy rule relating to network slice selection directly from an AF.

Upon receiving the request to set a policy rule relating to network slice selection, the data management node (e.g., UDM) selects one or more network slices to be associated with the application based on the application's associated application profile and application provider. The data management node creates a NSSP rule associating the application with one or more network slices. In certain embodiments, the data management node identifies one or more UEs associated with the application and thus affected by the created NSSP rule. The data management mode may also coordinate with one or more policy control functions to update the NSSP of any affected UEs.

FIG. 1 depicts a wireless communication system 100 for creating a NSSP rule based on an application identifier and corresponding application profile and application provider, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the LTE system specified in the 3GPP specifications. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

Each remote unit 105 includes at least one mobile application 108 that can communicate with an application function ("AF") 155 in the data network 150 via a data path 125. In some embodiments, the data path 125 is the data path of a PDU session established over one of the multiple network slices 138 supported by the mobile core network 310. The specific network slice 138 used by the PDU session is determined by the S-NSSAI attribute of the PDU session. Here, the remote unit 105 is provisioned with a NSSP which it uses to determine how to route the traffic of the mobile application 108. The mobile application 108 in the remote unit 105 may also communicate with other application functions 155. While a specific number of mobile applications 108 and application functions 155 are depicted in FIG. 1, one of skill in the art will recognize that any number of mobile applications 108 may be included in the remote unit 105 and any number of application functions 155 may be included in the wireless communication system 100.

The base units 110 may be distributed over a geographic region. In certain embodiments, a base unit 110 may also be referred to as an access terminal, a base, a base station, a Node-B, an eNB, a gNB, a Home Node-B, a relay node, a femtocell, an access point, a device, or by any other terminology used in the art. The base units 110 are generally part of an access network 120, such as a radio access network ("RAN"), that may include one or more controllers communicably coupled to one or more corresponding base units 110. These and other elements of the access network 120 are not illustrated but are well known generally by those having ordinary skill in the art. The base units 110 connect to the mobile core network 130 via the access network 120. The access network 120 and mobile core network 130 may be collectively referred to herein as a "mobile network" or "mobile communication network."

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC"), which may be coupled to a data network 150, like the Internet and private data networks, among other data networks. In some embodiments, the remote units 105 communicate with an application function ("AF") 155 (external to the mobile core network 13) via a network connection with the mobile core network 130. Each mobile core network 130 belongs to a single public land mobile network ("PLMN"). The present disclosure is not intended to be limited to the implementation of any particular wireless communication system architecture or protocol. For example, other embodiments of the mobile core network 130 include an enhanced packet core ("EPC") or a Multi-Service Core as describe by the Broadband Forum ("BBF").

The mobile core network 130 includes several network functions ("NFs") and multiple network slices 138. As depicted, the mobile core network 130 includes at least one unified data management with an internal user data repository ("UDM/UDR") 132, at least one policy control function ("PCF") 134, at least one access and mobility management function ("AMF") 136, and at least one network exposure function ("NEF") 137. Although a specific number of NFs are depicted in FIG. 1, one of skill in the art will recognize that any number of NFs may be included in the mobile core network 130. In certain embodiments, each of the multiple network slices 138 includes its own dedicated network functions (not shown), such as a session management function ("SMF") and user plane function ("UPF").

The UDM/UDR 132 comprises a Unified Data Management ("UDM") and its internal component User Data Repository ("UDR"). The UDR holds subscription data including policy data. Specifically, the policy data stored by the UDM/UDR 132 includes the NSSP. The UDM/UDR 132, PCF 134, AMF 136, and SMF (not shown) are examples of control plane network functions of the mobile core network 130. Control plane network functions provide services such as UE registration, UE connection management, UE mobility management, session management, and the like. In contrast, a user plane function (UPF) provides data transport services to the remote units 105.

The NEF 137 implements a "front end" service that interfaces with external application functions and exposes to these functions the capabilities of the mobile core network. For example, the NEF 137 can be used by an AF 155 to send a message to a group of remote units 105, to discover the location of a remote unit 105, to charge a certain remote unit 105, and the like. Thus, the NEF provides a single point of contact for external applications that want to utilize the services offered by the internal network functions of the mobile network (e.g., services of the AMF 136, PCF 134, UDM 132, SMF, etc.).

The multiple network slices 138 are logical networks within the mobile core network 130. The network slices 138 are partitions of resources and/or services of the mobile core network 130. Different network slices 138 may be used to meet different service needs (e.g., latency, reliability, and capacity). Examples of different types of network slices 138 include enhanced mobile broadband ("eMBB"), massive machine-type communication ("mMTC"), and ultra-reliability and low latency communications ("URLLC"). A mobile core network 130 may include multiple network slice instances of the same network slice type. Different network slice instance of the same type may be distinguished by a slice "tenant" (also known as "slice differentiator") associated with the instance.

As discussed above, a mobile application 108 running on the remote unit 105 communicates with the AF 155 via the data path 125 that passes through a network slice 138 of the mobile core network. Additionally, the AF 155 can send information to the mobile core network 130 which can be used to optimize the network internal configuration or network behavior. In certain embodiments, the AF 155 is an application server ("AS") or a service capability server ("SCS") enabling a mobile application 108 to access and use functionality provided by the server over standardized interfaces (e.g., APIs).

The wireless communication system 100 is capable of automatically constructing an NSSP rule for a mobile application 108 and to provide this rule to an affected remote unit 105. The NSSP rule indicates which S-NSSAI(s) is to be used for transferring the traffic of the mobile application 108. The NSSP is constructed and stored in the 5G mobile network and can be sent to a remote unit 105 via the N1 interface (e.g., the logical connection between the remote unit 105 and the AMF 136). Although the NSSP could be the same for all remote units 105 in the wireless communication system 100, in some embodiments each remote unit 105 may have its own NSSP. Here, a NSSP may be constructed by aggregating the NSSP rules applicable to the particular remote unit 105. For example, certain NSSP rules may only be applicable to certain types (or classes) of remote devices, only to certain subscription levels, only to subscribers of certain services, and the like.

An example NSSP with three rules is shown in the following table:

TABLE 1

| | Application Identity | Prioritized list of associated S-NSSAIs |
| --- | --- | --- |
| Rule 1 | OS = Android, ID = remote.sensing.carmaker | S-NSSAI-1 = ["automotive", "CarMaker"] |
| Rule 2 | OS = Android, ID = com.cast.webvideo | S-NSSAI-1 = ["mobile broadband", *] |
| Rule 3 | OS = Android, ID = gps.phone.tracker.lenovo | S-NSSAI-1 = ["iot", "Lenovo"], S-NSSAI-2 = ["iot", *], S-NSSAI-3 = ["mobile broadband", *] |

In the above table, the first NSSP rule indicates that the traffic of Android application "remote.sensing.carmaker" is to be sent over a PDU session established with 5-NSSAI= ["automotive", "CarMaker"]. Here, the S-NSSAI includes two parameters: a slice type (e.g., "automotive") and a slice tenant (e.g., "CarMaker"). Accordingly, a PDU session with this S-NSSAI will have a data path 125 that goes through a network slice 138 which serves the CarMaker automotive applications.

The second NSSP rule indicates that the traffic of Android application "com.cast.webvideo" is to be sent over a PDU session established with S-NSSAI=["mobile broadband", *], where "*" is a wildcard indicating that any network slice 138 that supports the "mobile broadband" traffic type is suitable for sending/receiving traffic of Android application "com.cast.webvideo". The third NSSP rule indicates that traffic of Android application "gps.phone.tracker.lenovo" is to be sent over a PDU session established with one of the following S-NSSAIs: ["iot", "Lenovo"], ["iot", *], or ["mobile broadband", *]. In the third NSSP rule, the S-NSSAIs are given in a prioritized list such that the remote unit 105 first attempts to send traffic for "gps.phone.tracker.lenovo" over a network slice 138 that supports the "IoT" traffic type and belonging to the tenant "Lenovo". Should such a PDU session be unable to be established, then the remote unit 105 next attempts to send traffic over another network slice 138 that supports the "IoT" traffic type. Finally, should a PDU session with an IoT-type network slice 138 be unable to be established, then the remote unit 105 attempts to send traffic over a PDU session established the network slice 138 that supports the "mobile broadband" traffic type.

When the remote unit 105 receives the NSSP, it uses the NSSP to determine how to route the traffic of its mobile applications 108. Specifically, the remote unit 105 routes the traffic of a mobile application 108 over a PDU session that matches one of the S-NSSAIs associated with the mobile application 108 according to the NSSP. For example, when the application "com.cast.webvideo" requests data communication, according to the NSSP shown in the table above, the remote unit 105 routes the traffic of this application over a PDU session with S-NSSAI=["mobile broadband", *]. If the remote unit 105 has no active PDU session with this S-NSSAI, the remote unit 105 requests the establishment of a new PDU session with S-NSSAI=["mobile broadband", *].

In order to automatically construct a NSSP rule, an AF 155 associated with a particular mobile application 108 sends a request to the mobile core network 130 to map the particular mobile application 108 to a network slice 138 matching a predetermined application profile. Here, the operator of the mobile core network 130 and the operator of the AF 155 have previously established an agreement enabling the AF 155 to establish an authenticated connection with the mobile core network 130 (e.g., to the NEF 137) and utilize the services exposed by the NEF 137.

Additionally, the operator of the mobile core network 130 provides to the operator of the AF 155 a list of supported application profiles. Each mobile application 108 supported by the AF 155 can then be matched with one of the supported application profiles based on the traffic characteristics of the mobile application 108 and/or based on the type of mobile application 108. Application profiles are discussed in greater detail with reference to FIG. 4. Based on the application and its corresponding application profile, the mobile core network 130 (e.g., the UDM/UDR 132) maps the applications identity to at least one network slice 138 (e.g., to specific S-NSSAI(s)) to create the NSSP rule.

Figure 2:
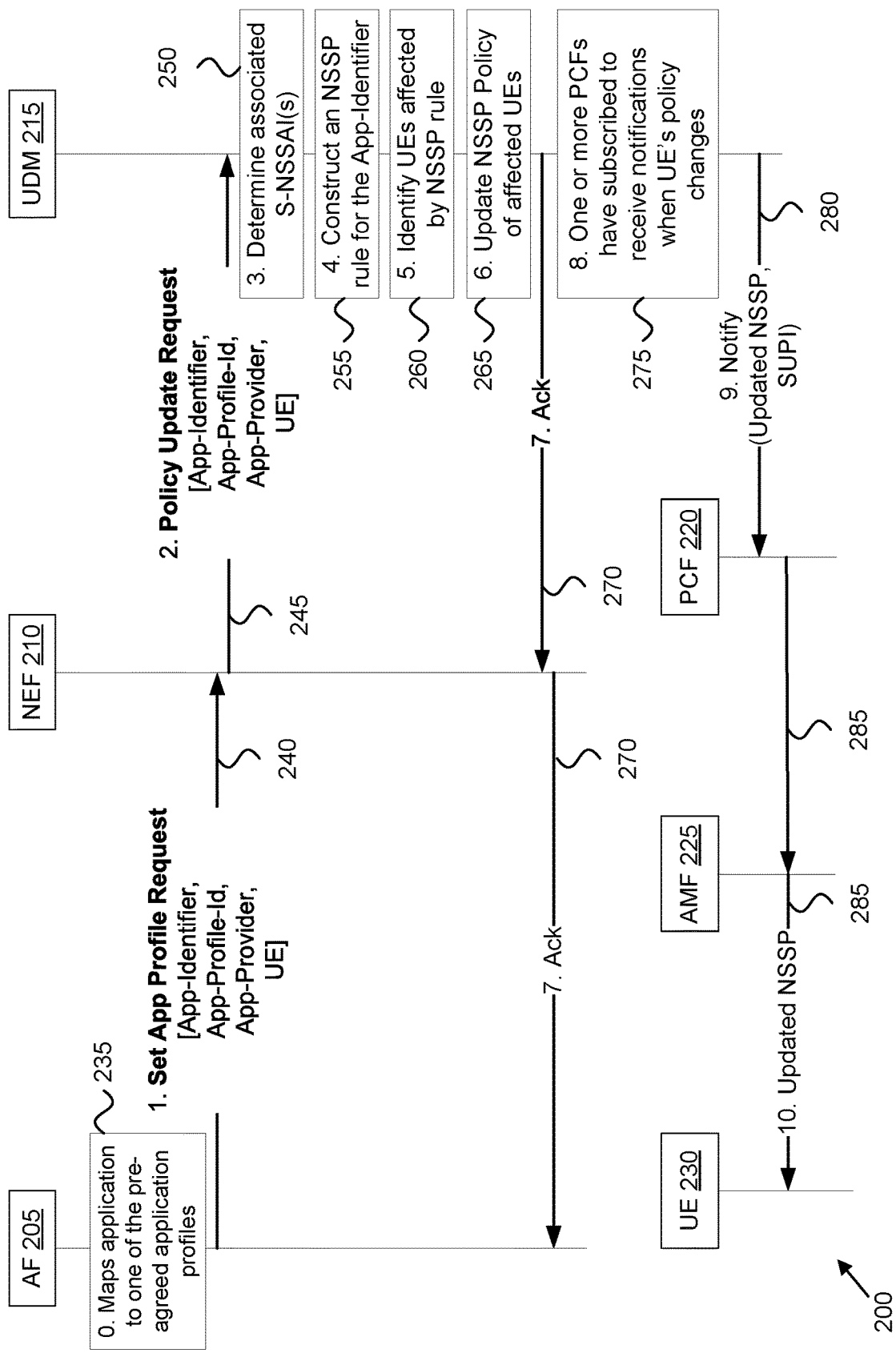
FIG. 2 is a block diagram illustrating one embodiment of a network procedure for creating a NSSP rule based on an application identifier and corresponding application profile and application provider.

FIG. 2 depicts a network procedure 200 for creating a NSSP rule based on an application identifier and corresponding application profile and application provider, according to embodiments of the disclosure. The network procedure 200 involves an AF 205, and NEF 210, a UDM 215, a PCF 220, and AMF 225, and the UE 230. The AF 205 may be one embodiment of the AF 155, the NEF 210 may be one embodiment of the NEF 137, and the UDM 215 may be one embodiment of the UDM/UDR 132 described above with reference to FIG. 1. The PCF 220 and AMF 225 may be embodiments of the PCF 134 and AMF 136 described above. Additionally, the UE 230 may be one embodiment of the remote unit 105 described above.

The description below is based on the following example scenario: Each automobile made by manufacturer "CarMaker" is equipped with a communication device (e.g., a UE). This device runs the Android operating system and has (i) a telemetry application that collects car sensor data which are sent to CarMaker's data center (Application Function; AF) and (ii) several other applications used for the in-car entertainment system, e.g., navigation apps, video streaming apps, web browsing apps, etc. All UEs in CarMaker cars should receive an NSSP policy which maps the telemetry application to a specific S-NSSAI-1 and all other applications to S-NSSAI-2. Instead of configuring this NSSP policy manually in the 5G network, the network procedure 200 creates the NSSP automatically after receiving a request from CarMaker's AF and distributes the NSSP to all applicable UEs.

The network procedure 200 begins with the AF 205 mapping a mobile application it supports to one of the predetermined application profiles provided by the mobile network operator (see block 235). Where the AF 205 supports multiple mobile applications, the AF 205 maps each mobile application to a predetermined application profile. For example, where the AF 205 supports the mobile application "remote.sensing.carmaker", the AF 205 may map this mobile application to a telemetry-type application profile.

After mapping the mobile applications to application profiles, the AF 205 sends a request to the NEF 210, depicted here as a "Set App Profile Request" (see messaging 240). After establishing a secure connection with the NEF 210, the AF 205 sends the Set App Profile Request which requests that the mobile network associate an application supported by AF (i) with a certain application profile and (ii) with a certain application provider. In one embodiment, the Set App Profile Request may include a set of one or more tuples, each tuple comprising an application identifier, a corresponding application profile, and a corresponding application provider. In another embodiment, the Set App Profile Request includes (a) a list of application identifiers, (b) a list of application profiles and (c) a list of application providers, and each application identifier in the list of application identifiers is associated with an application profile contained in the list of application profiles and with an application provider contained in the list of application providers.

Using the above example, the AF 205 may request that the mobile application "remote.sensing.carmaker" be associated with a specific telemetry-type application profile and also associated with the application provider "CarMaker." In certain embodiments, the Set App Profile Request may omit the application provider parameter where this parameter can be implicitly derived. For example, if the AF 205 is associated only with a single application provider (e.g., based on the agreement with the mobile network operator), then the application provider may be omitted.

In some embodiments, the Set App Profile Request also includes the identity of one or more UEs affected by the requested association. The Set App Profile Request may include UE parameter containing the identity of a single UE, the identities of multiple UEs, or a UE group identity. Where no UE parameter is included, the NEF 210 may interpret the Set App Profile Request as affecting all UEs in the mobile network or, alternatively, as affecting only UEs associated with the identified application provider (e.g. based on subscription). For example, if the application provider is "CarMaker" the UEs associated with this application provider are all UEs in automobiles associated with (e.g., made by) the entity "CarMaker".

In certain embodiments, when the Set App Profile Request includes the identity of a single UE, or the identities of multiple UEs, each one of these identities is an External Identity, such as an MSISDN identity, used by the AF 205 and the mobile network (e.g., UDM 215) to identify a specific subscriber of the mobile network. For example, when the UE 230 registers with the AF 205, or contacts the AF 205 for the first time, the UE 230 sends its MSISDN identity to the AF 205. In this way, the AF 205 becomes aware of the MSISDN identities of one or more UEs that utilize the considered application.

In certain embodiments, the Set App Profile Request includes a UE group identity which is an identity pre-agreed between the mobile network operator and the AF operator. The UE group identity may refer to all subscribers/UEs associated with the identified application (e.g. all UEs in CarMaker cars or all UEs manufactured by Lenovo).

The NEF issues a "Policy Update Request" to UDM which requests to update the policy data of a single UE or of a group of UEs (see messaging 245). Here, the NEF 210 formats the AF 205 request into a Policy Update Request which it sends to the UDM 215. The contents of the Policy Update Request are substantially the same as the contents of the Set App Profile Request. Where the Set App Profile Request omits the application provider, the NEF 210 may add the application provider parameter to the Policy Update Request.

For each application identifier, the UDM 215 determines one or more S-NSSAI to associate with the application identifier (see block 250). Based on the received Application Profile ID and Application Provider, the UDM 215 determines an S-NSSAI or a prioritized list of S-NSSAIs that can be associated with the identified application. Where multiple S-NSSAIs are associated with the application identifier, the UDM 215 may further determine the order in which a UE is to attempt to use the S-NSSAIs, thereby forming the prioritized list.

The S-NSSAIs determined in response to the Policy Update Request are referred to herein as the "associated S-NSSAIs". The associated S-NSSAIs may be determined either by UDM 215 alone or in association with other network elements (e.g. a Network Slice Selection Function, "NSSF"). In certain embodiments, a single application profile may correspond to multiple S-NSSAIs. In other embodiments, a single application profile corresponds only to a single S-NSSAI. Further, several application profiles may correspond to a single-NSSAI.

After associating the application identifier with an S-NSSAI, the UDM 215 constructs a generic NSSP rule for the identified application (see block 255). For example, this NSSP rule can contain: App-Identifier=remote.sensing.carmaker, S-NSSAI-1=["automotive", "CarMaker"], S-NSSAI-2=["automotive", "*"]. The S-NSSAI-1 and the S-NSSAI-2 are to two S-NSSAIs associated with the application with identity "remote.sensing.carmaker" and the S-NSSAI-1 has the highest priority.

In response to creating a new NSSP rule, the UDM 215 identifies one or more UEs affected by the new rule (see block 260). The UDM 215 identifies the affected UEs based on the UE identities included in the Policy Update Request. If the Policy Update Request includes no UE identities, then the affected UEs are derived based on the application provider. For example, the mobile network may be configured to associate one or more UEs with a certain application provider, in which case, a generic NSSP rule created above for this application provider affects all these UEs.

For each affected UE, the UDM 215 checks if the associated S-NSSAIs are included in the list of subscribed S-NSSAIs of this UE. As used here, the list of subscribed S-NSSAIs refers to those S-NSSAIs the UE is permitted to access (e.g., based on the UE's subscriber data). If an associated S-NSSAI is not included in the list of subscribed S-NSSAIs of a UE, then the UDM 215 determines whether network policy allows the AF 205 to cause changes in the subscription data of this UE. Where the AF 205 is permitted to cause changes, then the associated S-NSSAI(s) not included in the list of subscribed S-NSSAIs is added in the list of subscribed S-NSSAIs for this UE. However, if the AF 205 is not allowed to cause changes in the subscription data of this UE, then the associated S-NSSAI(s) not included in the list of subscribed S-NSSAIs are removed from the list of associated S-NSSAIs for the UE.

For example, if the UDM 215 determines two associated S-NSSAIs for the application "remote.sensing.carmaker" (S-NSSAI-1=["automotive", "CarMaker"] and S-NSSAI-2=["automotive", "*"]), but S-NSSAI-1 is not included in the list of subscribed S-NSSAIs for the UE 230 and cannot be added to this list based on network policy, then the NSSP rule for the UE 230 would contain only the S-NSSAI-2 that is included in the list of subscribed S-NSSAIs for the UE 230. Here, the resulting NSSP rule for the UE 230 contains the application identity "remote.sensing.carmaker" and the network slice identity S-NSSAI-2. Otherwise, if S-NSSAI-1 can be added to the list, then the resulting NSSP rule for the UE 230 contains the application identity "remote.sensing.carmaker" and the network slice identities S=NSSAI-1 and S-NSSAI-2.

In certain embodiments, if the UDM 215 changes the list of subscribed S-NSSAIs for the UE 230, the UDM 215 may also update the AMF 225 serving the UE 230 with the new list of subscribed S-NSSAIs. This can be done by initiating a subscription data update procedure towards the AMF 225 serving the UE 230.

In response to identifying one or more UEs affected by the new NSSP rule, the UDM 215 updates the NSSP of the affected UEs with the new NSSP rule (see block 265). The UDM 215 sends an acknowledgment message to the NEF 210, which in turn sends an acknowledgment message to the AF 205 (see messaging 270). Where a new (generic) NSSP rule is successfully created, the acknowledgment message contains a positive acknowledgement ("ACK"). In some embodiments, a new generic NSSP rule may not be created, for example due to subscription limitations. Here, the acknowledgement message contains a negative acknowledgement ("NAK"). In certain embodiments, the acknowledgement message containing a NAK may also include a reason code indicating why the new generic NSSP rule was not created. In other embodiments, the acknowledgement message contains NAK when the NSSP of the UE contained in message 245 cannot be updated.

After updating the NSSPs of one or more affected UEs, the UDM 215 identifies one or more PCFs which have subscribed to receive notifications when a UE's policy changes (see block 275). Here, the PCF(s) may subscribe with the UDM 215 to receive policy updates for one or more of the affected UEs. For example, the PCF 220 may subscribe with the UDM 215 to receive policy updates for the UE 230 when the UE 230 registers with the mobile network.

Here the UDM 215 identifies that the NSSP of the UE 230 has changed and that the PCF 220 serves the UE 230. The UDM 215 then notifies the PCF 220 of the updated NSSP (see messaging 280). The UDM sends a notify message to each PCF that is subscribed to receive policy updates for an affected UE. This message informs the PCF 220 that the NSSP policy of the affected UE has been updated. Each affected UE is identified by its Subscriber Permanent Identity (SUPI).

The PCF 220 forwards the updated NSSP to the AMF 225 which serves the UE 230 and the AMF 225 forwards the updated NSSP to the UE 230 over the N1 signaling interface (see messaging 285). For example, the PCF 220 may forward the new NSSP rule created by the UDM 215 towards the UE 230. More generally, each notified PCF forwards the updated NSSP policy to one or more of the affected UEs, e.g. sends to the UE the new NSSP rule created by UDM 215. As an example, the new NSSP rule may be included in a NAS Configuration Update command and sent to an affected UE using the normal N1 signaling procedures. As another example, the NSSP rule may be included in a NAS Transport message from the AMF 225 to the UE 230 (e.g., in case that the AMF 225 is unaware about the content of the information received from the PCF 220).

After receiving the new NSSP rule(s), whenever the mobile application "remote.sensing.carmaker" in the UE 230 requests data communication, the UE 230 transfers data for that application within a PDU session matching the S-NSSAI associated with this application (e.g., according to the received NSSP rule). Therefore, the data of the mobile application "remote.sensing.carmaker" is transferred via the network slice 138 related with this S-NSSAI.

Beneficially, the network procedure 200 avoid the need for deep packet inspection, or similar analysis, of traffic from a mobile application 108 to determine a suitable network slice after the UE 230 has already sent traffic for this mobile application 108 on a certain PDU session. Rather, the network procedure 200 allows the UDM 215 to automatically create the NSSP using information received by the application provider (e.g., via the AF 205).

Figure 3:
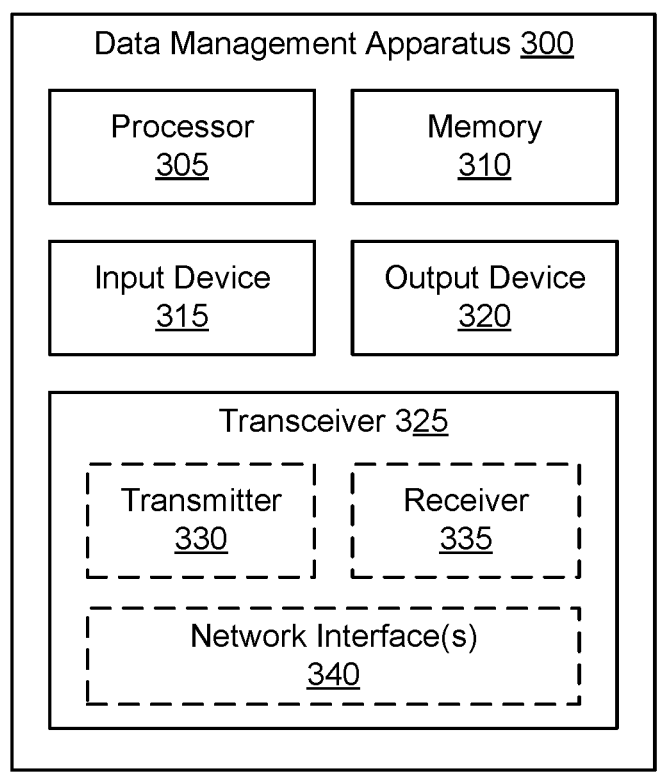
FIG. 3 is a schematic block diagram illustrating one embodiment of a network function apparatus for creating a NSSP rule based on an application identifier and corresponding application profile and application provider.

FIG. 3 depicts one embodiment of a data management apparatus 300 that may be used for creating a NSSP rule based on an application identifier and corresponding application profile and application provider, according to embodiments of the disclosure. The data management apparatus 300 may be one embodiment of the UDM/UDR 132 and/or the UDM 215. Furthermore, the data management apparatus 300 includes a processor 305, a memory 310, an input device 315, a display 320, and a transceiver 325. In some embodiments, the input device 315 and the display 320 are combined into a single device, such as a touchscreen. In certain embodiments, the data management apparatus 300 may not include any input device 315 and/or display 320.

The transceiver 325 communicates with other network functions in a mobile communication network (e.g., the NEF 137 and/or PCF 134). In one embodiment, the data management apparatus 300 communicates directly with the AF 155. In another embodiment, the data management apparatus 300 receives communications from the AF 155 via the NEF 127. The transceiver 325 may include at least one transmitter 330 and at least one receiver 335. Additionally, the transceiver 325 may support at least one network interface 340 such as a "N25/Nudr" interface used to communicate with a PCF 134.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the processor 305 receives a first request from a network function. Here, the first request is a policy update request. In one embodiment, the first request is received from a NEF, such as the NEF 137. As discussed above, the NEF may receive a request to set an application profile, wherein the NEF formats this request and sends it to the data management apparatus 300 as the first request.

The first request includes at least a list (or set) of one or more application identifiers and, for each application identifier, both a corresponding application profile and a corresponding application provider. In one embodiment, the first request includes an application provider parameter that indicates an application provider associated with the list of application identifiers. In certain embodiments, the first request includes an identity of one more UEs affected by the first request. For example, the first request may include a single UE identifier, a list of multiple UE identifiers, or a UE group identity to indicate which UEs are affected by the request.

In response to the first request, the processor 305 determines one or more network slice identifiers (e.g., S-NSSAIs) associated with each application identifier in the list of application identifiers. Here, the processor 305 selects the one or more network slice identifiers based on the corresponding application profile and the corresponding application provider of the application identifier. The processor 305 also creates a NSSP rule for each application identifier in the list of application identifiers, the NSSP rule containing the application identifier and the associated one or more network slice identifiers.

Additionally, the processor 305 may update the NSSP of each of UE affected by the first request. Here, the NSSP for the UE including one or more rules for associating an application identifier with one or more subscribed S-NSSAIs. In some embodiments, the processor 305 updates the NSSP for a UE in the mobile communication network selected based on the associated one or more network slice identifiers (e.g., S-NSSAIs). Here, updating the NSSP for the UE may include determining whether the associated one or more S-NSSAIs match the subscribed S-NSSAIs in the NSSP and adding an S-NSSAI of the associated one or more S-NSSAIs to the one or more subscribed S-NSSAIs in response to the S-NSSAI not matching the subscribed S-NSSAIs in the NSSP.

In one embodiment, updating the NSSP for the UE further includes the processor 305 creating one or more new NSSP rules in the NSSP in response to adding an S-NSSAI of the associated one or more S-NSSAIs to the one or more subscribed S-NSSAIs. In another embodiment, updating the NSSP for the UE further includes the processor 305 initiating a subscription data update procedure in response to adding an S-NSSAI of the associated one or more S-NSSAIs to the one or more subscribed S-NSSAIs. Still further the processor 305 may update the NSSP for the UE by identifying a PCF subscribed to receive policy updates for a UE affected by the first request and notifying the PCF to receive a policy update for the UE.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to creating a NSSP rule based on an application identifier and corresponding application profile and application provider, for example storing subscriber data, policy data, application identifiers, application profiles, S-NSSAIs, and the like. In some embodiments, the memory 310 also stores program code and related data, such as an operating system or other controller algorithms operating on the data management apparatus 300 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315. As noted above, in certain embodiments the data management apparatus 300 does not include an input device 315 and/or display 320.

The transceiver 325 communicates with network functions in a mobile communication network. The transceiver 325 operates under the control of the processor 305 to transmit messages, data, and other signals and also to receive messages, data, and other signals. For example, the processor 305 may selectively activate the transceiver 325 (or portions thereof) at particular times in order to send and receive messages. The transceiver 325 may include one or more transmitters 330 and one or more receivers 335 for communicating with network functions in the mobile communication network. As discussed above, the transceiver 325 may support one or more the network interfaces 340 for communicating with network functions in the mobile communication network.

FIG. 4 depicts a set 400 of application profiles used for creating a NSSP rule based on an application identifier and corresponding application profile and application provider, according to embodiments of the disclosure. Here, the set 400 includes multiple profile entries 405. Each profile entry contains a set index 410 and a profile definition 415. As depicted, the profile definition includes an application profile ID, an application type, and optionally a traffic characteristic, such as a traffic rate parameter or delay parameter. As described herein, the mobile network operator provides the set 400 of application profiles to an operator of an AF. The AF operator identifies a best candidate of the profile entries 405 for each mobile application it supports. For example, the set index may indicate the order in which the AF operator is to consider the application profiles.

Figure 5:
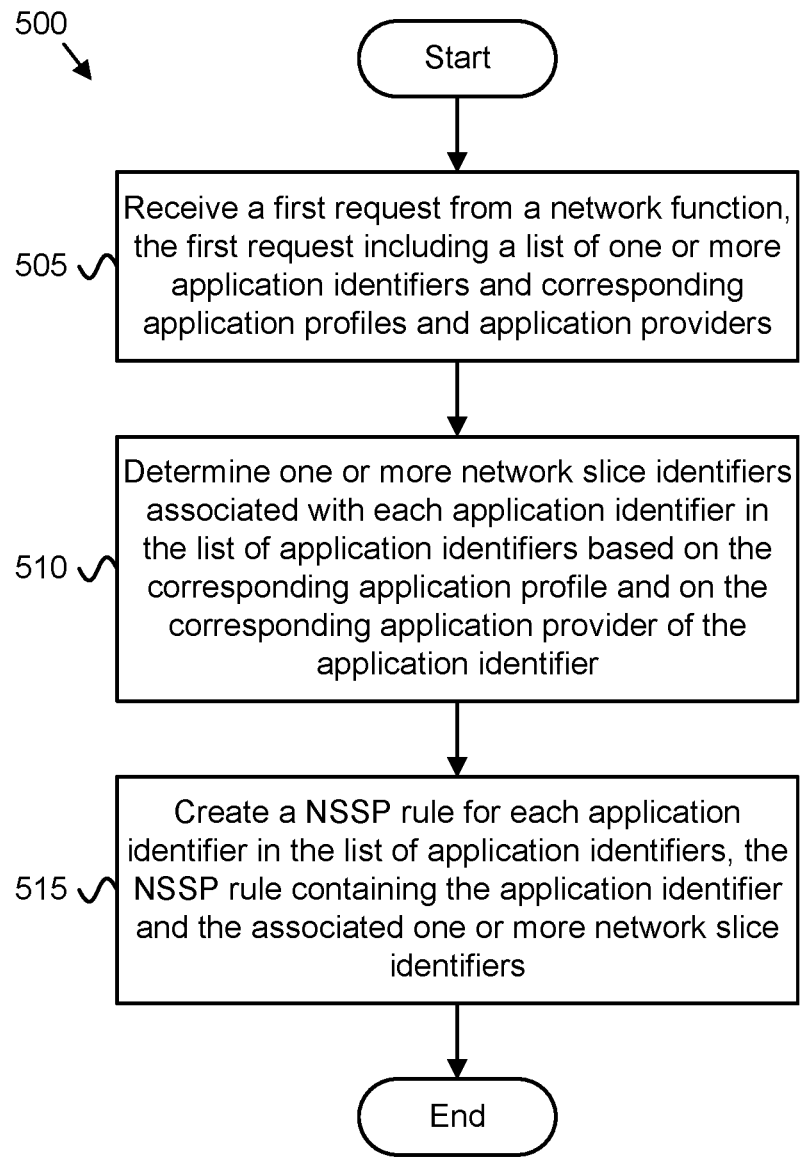
FIG. 5 is a schematic flow chart diagram illustrating one embodiment of a method for creating a NSSP rule based on an application identifier and corresponding application profile and application provider.

FIG. 5 depicts a method 500 for creating a NSSP rule based on an application identifier and corresponding application profile and application provider, according to embodiments of the disclosure. In some embodiments, the method 500 is performed by an apparatus, such as the UDM/UDR 132, the UDM 215, and/or the data management apparatus 300. In certain embodiments, the method 500 may be performed by a processor executing program code, for example, a microcontroller, a microprocessor, a CPU, a GPU, an auxiliary processing unit, a FPGA, or the like.

The method 500 begins and receives 505 a first request from a network function, the first request including a list (or set) of one or more application identifiers and for each application identifier a corresponding application profile and a corresponding application provider. In some embodiments, receiving 505 the first request from a network function includes received the first request from a NEF. For example, the NEF may generate the first request from a Set Profile request received from an AF, as discussed above with reference to FIG. 2. In certain embodiments, the first request includes an application provider parameter that indicates an application provider associated with the list of application identifiers.

In some embodiments, the first request includes an indication of one more remote units affected by the first request. In certain embodiments, the indication of one more remote units affected by the first request may be a single UE identifier, a list of multiple UE identifiers, or a UE group identity.

The method 500 includes determining 510 one or more network slice identifiers associated with each application identifier in the list (or set) of application identifiers based on the corresponding application profile and on the corresponding application provider of the application identifier. In certain embodiments, the one or more network slice identifiers are one or more single network slice selection assistance information ("S-NSSAIs").

The method 500 includes creating 515 a NSSP rule for each application identifier in the list (or set) of application identifiers, the NSSP rule containing the application identifier and the associated one or more network slice identifiers. In some embodiments, creating 515 a NSSP rule includes updating the NSSP of each of the one more remote units affected by the first request. Here, a NSSP for a remote unit includes one or more rules for associating an application identifier with one or more subscribed S-NSSAIs.

In certain embodiments, creating 515 a NSSP rule includes updating a NSSP for a remote unit in the mobile communication network selected based on the associated one or more network slice identifiers. Here, updating the NSSP for the remote unit may include determining whether the associated one or more S-NSSAIs match the subscribed S-NSSAIs in the NSSP and adding an S-NSSAI of the associated one or more S-NSSAIs to the one or more subscribed S-NSSAIs in response to the S-NSSAI not matching the subscribed S-NSSAIs in the NSSP.

In one embodiment, updating the NSSP for the remote unit further includes creating one or more new NSSP rules in response to adding an S-NSSAI of the associated one or more S-NSSAIs to the one or more subscribed S-NSSAIs. In another embodiment, updating the NSSP for the remote unit further includes initiating a subscription data update procedure in response to adding an S-NSSAI of the associated one or more S-NSSAIs to the one or more subscribed S-NSSAIs. In certain embodiments, updating the NSSP for the remote unit includes identifying a policy control function ("PCF") subscribed to receive policy updates for the remote unit and notifying the PCF to receive a policy update for the remote unit. The method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a transceiver that communicates with one or more network functions in a mobile communication network that supports multiple network slices, each network slice associated with one or more network slice identifiers;
   a processor that:
   receives a first request from a network exposure function, the first request comprising a list of one or more application identifiers and for each application identifier a corresponding application profile and a corresponding application provider;
   determines one or more network slice identifiers associated with each application identifier in the list of one or more application identifiers based on the corresponding application profile and the corresponding application provider of the application identifier; and
   creates a network slice selection policy ("NSSP") rule for each application identifier in the list of one or more application identifiers, the NSSP rule containing the application identifier and the associated one or more network slice identifiers.

2. The apparatus of claim 1, wherein the first request includes an identity of one more remote units affected by the first request.

3. The apparatus of claim 2, wherein the identity of one more remote units affected by the first request is selected from the group consisting of: a single user equipment ("UE") identifier, a list of multiple UE identifiers, and a UE group identity.

4. The apparatus of claim 2, wherein the processor updates a route selection policy of each of the one more remote units affected by the first request.

5. The apparatus of claim 1, wherein the processor further updates a route selection policy for a remote unit in the mobile communication network based on the associated one or more network slice identifiers, the route selection policy for the remote unit comprising one or more rules for associating an application identifier with one or more subscribed single network slice selection assistance information ("S-NSSAIs").

6. The apparatus of claim 5, wherein the associated one or more network slice identifiers are one or more S-NSSAIs and wherein, to update the route selection policy for the remote unit, the processor:
   determines whether the associated one or more S-NSSAIs match the one or more subscribed S-NSSAIs in the route selection policy; and
   adds an S-NSSAI of the associated one or more S-NSSAIs to the one or more subscribed S-NSSAIs in response to the S-NSSAI not matching the one or more subscribed S-NSSAIs in the route selection policy.

7. The apparatus of claim 6, wherein, to update the route selection policy for the remote unit, the processor creates one or more new NSSP rules in response to adding an S-NSSAI of the associated one or more S-NSSAIs to the one or more subscribed S-NSSAIs.

8. The apparatus of claim 6, wherein, to update the route selection policy for the remote unit, the processor initiates a subscription data update procedure in response to adding an S-NSSAI of the associated one or more S-NSSAIs to the one or more subscribed S-NSSAIs.

9. The apparatus of claim 5, wherein, to update the route selection policy for the remote unit, the processor identifies a policy control function ("PCF") subscribed to receive policy updates for the remote unit and notifying the PCF to receive a policy update for the remote unit.

10. The apparatus of claim 1, wherein the apparatus comprises:
    a unified data management apparatus;
    a user data repository;
    or combinations thereof.

11. A method comprising:
    receiving a first request from a network exposure function in a mobile communication network, the first request comprising a list of one or more application identifiers and, for each application identifier, a corresponding application profile and a corresponding application provider, wherein the mobile communication network supports multiple network slices, each network slice associated with one or more network slice identifiers;
    determining one or more network slice identifiers associated with each application identifier in the list of one or more application identifiers based on the corresponding application profile and on the corresponding application provider of the application identifier; and
    creating a network slice selection policy ("NSSP") rule for each application identifier in the list of one or more application identifiers, the NSSP rule containing the application identifier and the associated one or more network slice identifiers.

12. The method of claim 11, wherein the first request includes an identity of one more remote units affected by the first request.

13. The method of claim 12, wherein the identity of one more remote units affected by the first request is selected from the group consisting of: a single user equipment ("UE") identifier, a list of multiple UE identifiers, and a UE group identity.

14. The method of claim 12, further comprising updating a route selection policy of each of the one more remote units affected by the first request.

15. The method of claim 11, further comprising updating a route selection policy for a remote unit in the mobile communication network based on the associated one or more network slice identifiers, the route selection policy for the remote unit comprising one or more rules for associating an application identifier with one or more subscribed single network slice selection assistance information ("S-NSSAIs").

16. The method of claim 15, wherein the associated one or more network slice identifiers are one or more S-NSSAIs and wherein updating the route selection policy for the remote unit comprises:
    determining whether the associated one or more S-NSSAIs match the one or more subscribed S-NSSAIs in the route selection policy; and
    adding an S-NSSAI of the associated one or more S-NSSAIs to the one or more subscribed S-NSSAIs in response to the S-NSSAI not matching the one or more subscribed S-NSSAIs in the route selection policy.

17. The method of claim 16, wherein updating the route selection policy for the remote unit further comprises creating one or more new NSSP rules in response to adding an S-NSSAI of the associated one or more S-NSSAIs to the one or more subscribed S-NSSAIs.

18. The method of claim 16, wherein updating the route selection policy for the remote unit further comprises initiating a subscription data update procedure in response to adding an S-NSSAI of the associated one or more S-NSSAIs to the one or more subscribed S-NSSAIs.

19. The method of claim 15, wherein updating the route selection policy for the remote unit comprises identifying a policy control function ("PCF") subscribed to receive policy updates for the remote unit and notifying the PCF to receive a policy update for the remote unit.

20. A system comprising:
- a network exposure function ("NEF") for a mobile communication network that supports multiple network slices, each network slice associated with one or more network slice identifiers; and
- a unified data management ("UDM") node that:
- receives a first request from the NEF, wherein the first request comprises a set of one or more application identifiers and, for each application identifier, a corresponding application profile and a corresponding application provider;
- determines one or more network slice identifiers associated with each identified application based on the corresponding application profile and on the corresponding application provider of each application identifier; and
- creates a network slice selection policy ("NSSP") rule for each application identifier in the set of one or more application identifiers, the NSSP rule containing the application identifier and the associated one or more network slice identifiers.

\* \* \* \* \*